United States Patent [19]

Rosen

[11] Patent Number: 4,961,551

[45] Date of Patent: Oct. 9, 1990

[54] STABILIZATION OF A SPINNING SPACECRAFT OF ARBITARY SHAPE

[75] Inventor: Harold A. Rosen, Santa Monica, Calif.

[73] Assignee: Hughes Aircraft Company, Los Angeles, Calif.

[21] Appl. No.: 272,858

[22] Filed: Nov. 18, 1988

[51] Int. Cl.$^5$ .............................................. B64G 1/24
[52] U.S. Cl. ................................... 244/164; 244/169; 244/172
[58] Field of Search ............. 244/169, 164, 172, 3.21, 244/3.22, 3.15, 3.1

[56] References Cited

U.S. PATENT DOCUMENTS

| | | | |
|---|---|---|---|
| 4,725,024 | 2/1988 | Vorlicek | 244/164 |
| 4,767,084 | 8/1988 | Chan et al. | 244/164 |

*Primary Examiner*—Charles T. Jordan
*Assistant Examiner*—Rochelle Lieberman
*Attorney, Agent, or Firm*—Steven M. Mitchell; Robert A. Westerlund; W. K. Denson-Low

[57] ABSTRACT

A stabilization system for a spacecraft (10) which enables the spacecraft to be stabilized by rotation about any principal moment of inertia axis. The system includes two pairs of control thrusters (14, 16, 18, 20) for producing positive and negative control moments about two orthogonal axes mutually perpendicular to the axis of rotation of the spacecraft. The control system (40) includes rate gyros (42, 46) which provide error signals which are sent to duty cycle modulators (54). The duty cycle modulators provide a pulse width modulated control signal to the control thrusters to approximate proportional control of spacecraft attitude.

5 Claims, 2 Drawing Sheets

STABILIZATION OF A SPINNING SPACECRAFT OF ARBITRARY SHAPE

BACKGROUND AND SUMMARY OF THE INVENTION

1. Field of the Invention

This invention relates to a system for stabilizing a spinning spacecraft exposed to disturbing moments.

2. Description of Related Art

Spin stabilization is the simplest technique for controlling spacecraft attitude for spacecraft orbited around the earth. A spacecraft can be characterized as having three orthogonal moment of inertia axes which typically each have a unique moment of inertia value, thus defining a principal or maximum axis, a minimum axis, and an intermediate axis. Rotation about any axis presents stability concerns which are alleviated by the present invention.

As an alternative to rotating a spacecraft about an unstable axis or when subjected to destabilizing forces, a three-axis active control system can be used. These systems are complex, and are subject to gyro drift error which can lead to attitude inaccuracies.

Present nutation control systems for spinning spacecraft typically require nutation to reach a predetermined level before corrective thruster firing occurs and thus does not provide proportional attitude control. In some cases, this can cause loss of control.

SUMMARY OF THE INVENTION

In accordance with this invention, an improved active stability control system is provided for spacecraft of various configurations including oblate, intermediate or prolate body forms. The system enables rotation about any of the principal moment of inertia axes of the spacecraft. Since the control system according to this invention requires a small expenditure of propellants, it is primarily useful for the transfer orbit phase of a mission rather than the continuous on-station phase. The present system provides essentially a two-axis control used with a spinning spacecraft. The system employs error signals which fire thrusters which are duty cycle modulated to provide the equivalence of proportional control over spacecraft attitude.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENTS

Figure 1:
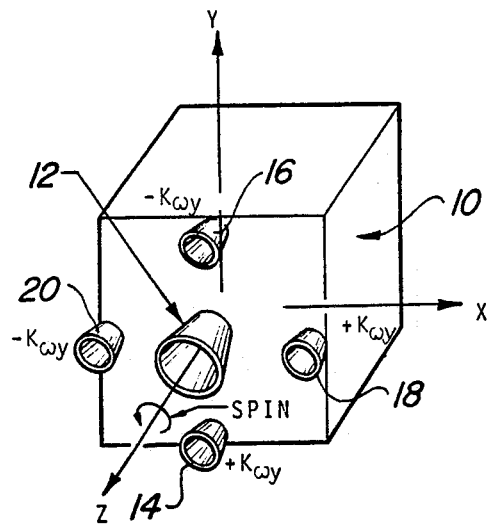
FIG. 1 is a pictorial diagram of a spacecraft including the active stabilization system of this invention with control thrusters positioned according to a first embodiment of this invention.

The physical elements of the system according to the present invention will be described with reference to the Figures, which will be followed by a description of the theory of operation of the system. FIG. 1 illustrates a spacecraft 10 represented graphically having main thruster 12 provided for boosting the spacecraft to the desired orbital position. Orthogonal axes are shown with spacecraft 10 rotating about the z-axis. A number of control thrusters are shown which are controlled in accordance with this invention to maintain stability of rotation about the z-axis, including plus and minus x-axis thrusters 14 and 16, respectively; and plus and minus y-axis thrusters 18 and 20, respectively. As their description suggests, thrusters 14 through 20 produce thrust along vectors displaced from the spacecraft center of mass (C.M.) thus producing positive and negative moments about their respective axes.

Figure 2:
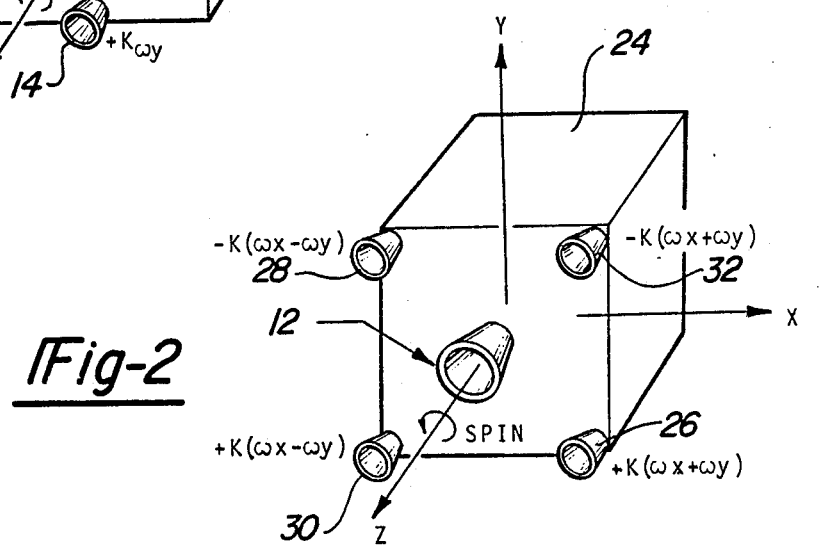
FIG. 2 is a schematic diagram of a spacecraft like FIG. 1 but showing control thrusters positioned according to a second embodiment of this invention.

FIG. 2 shows an alternate embodiment of the present invention which is identical to the first described embodiment with the exception that spacecraft 24 has thrusters 26, 28, 30 and 32, which re moved to the outer corners of the spacecraft. Thrusters 26 through 32 are not located on the axes (unless the axes are rotated) and, as shown in the drawing, produce moments which are resolved along two axes. The second embodiment provides advantages in that the thruster outputs provide a greater control moment than the embodiment depicted by FIG. 1 due to the greater distance of their thrust vectors from the center of mass.

Figure 4:
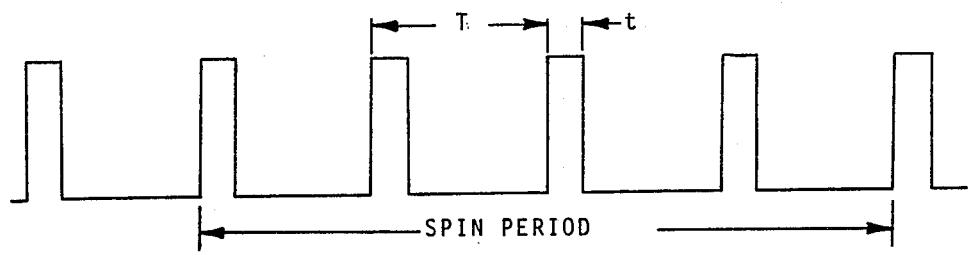
FIG. 4 is a graph showing the output of the duty cycle modulators used with the present invention.
Figure 3:
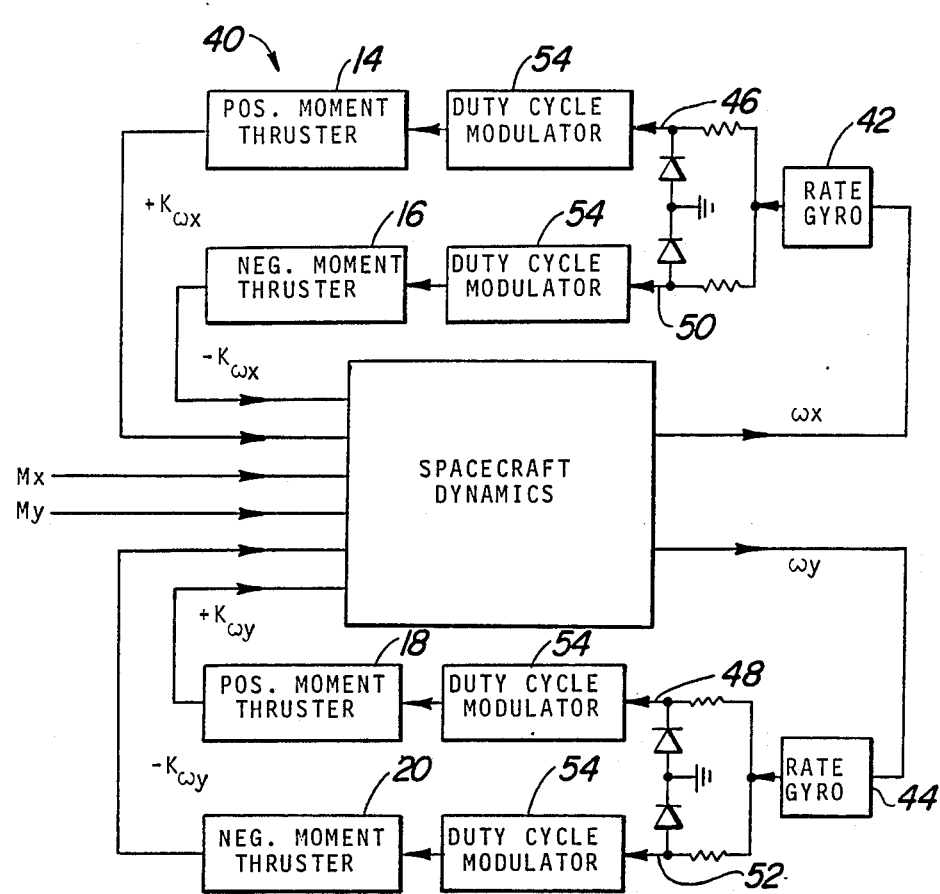
FIG. 3 is a block diagram showing the control system for the stabilization system according to the present invention.

FIG. 3 provides a graphical illustration of stabilization control system 40 in accordance with this invention. A pair of angular rate gyros 42 and 44 measure the transverse angular velocity ($\omega$) about the x and y axes, respectively. The outputs from gyros 42 and 44 are separated into positive error channels 46 and 48, and negative error channels 50 and 52. Duty cycle modulators 54 provide a pulse-width modulated control signal having a duty cycle proportional to the magnitude of error signals along channels 46 through 52. This modulation provides the equivalence of proportional control moments by control thrusters even though such thrusters typically have only on or off states. Preferably, the frequency of control modulation is at least several times the spin frequency of spacecraft 10 in order not to excite pendulous motion of the fuel in internal tanks. A typical pulse-train output from a modulator 54 is shown in FIG. 4 which shows the duty cycle modulation output. FIG. 4 shows a total pulse period of T with a duration of t and a frequency of four times the spin period of spacecraft 10. Duty cycle modulators 54 directly control thrusters 14 through 20 as shown in the figure to provide moments which stabilize spacecraft 10.

The following will discuss the theories of operation for control system 40. Let the moments of inertia of a spacecraft 10 about the three principal axes x, y, and z be called $I_x$, $I_y$, and $I_z$, respectively, with z being the spin axis. Let $I_z/I_x$ be $\sigma_x$ and $I_z/I_y$ be $\sigma_y$. If both $\sigma_x \sigma_y$ are much greater than unity, spacecraft 10 is unconditionally stable. For values of $\sigma_x$ and $\sigma_y$ close to but greater than unity, fuel motion within spacecraft 10 can exacerbate wobble induced by cross products of inertia or by thrust misalignment of main thruster 12 and for some conditions result in a runaway amplification of the wobble angle. For values of $\sigma_x$ and $\sigma_y$ less than unity, nutational instability is caused by de-dampers on the spacecraft 10 unless some means of stabilization is employed. For spin about an intermediate moment inertia axis, such as occurs if $\sigma_x$ is greater than unity while $\sigma_y$ is less than unity, or vice versa, a rapid divergence of wobble angle occurs unless an effective means of stabilization is employed such as the system according to this invention.

Euler's moment equations can be expressed as follows:

$$s\omega_x + (\sigma_y - 1)\frac{I_y}{I_x} \omega_z\omega_y = \frac{L_x}{I_x}$$

$$-(\sigma_x - 1)\frac{I_x}{I_y} \omega_z\omega_x + s\omega_y = \frac{L_y}{I_y}$$

Let $$\frac{L_x}{I_x} = M_x - K\omega_x \text{ and } \frac{L_y}{I_y} = M_y - K\omega_y$$

then $$\omega_x = \frac{(S + K) M_x - (\sigma_y - 1)\frac{I_y}{I_x} \omega_x M_y}{(S + K)^2 + (\sigma_x - 1)(\sigma_y - 1)\omega_z^2}$$

$$\omega_y = \frac{(S + K) M_y - (\sigma_x - 1)\frac{I_x}{I_y} \omega_z M_x}{(S + K)^2 + (\sigma_x - 1)(\sigma_y - 1)\omega_z^2}$$

where $\omega_x$, $\omega_y$, and $\omega_z$ are the angular velocities about the x, y, and z axes, respectively, and $L_x$ and $L_y$ are the external moments about the x and y axes, and $M_x$, $M_y$ are the normalized external moments about the x and y axes, thus $$M_x = \frac{L_x}{I_x} \quad M_y = \frac{L_y}{I_y}$$

K is the feedback gain supplied by control system 40, and s is Laplace's differential operator.

As discussed above, control system 40 measures the transverse angular rates of spacecraft 10 with rate gyros 42 and 44 and creates proportional control moments by duty cycle modulation of appropriate control thrusters. The behavior of the system with and without this feedback is explained by Euler's moment equations.

When the feedback factor K is zero, i.e., control system 40 is inoperative, the determinant is $s^2+(\sigma_x-1)(\sigma_y-1)\omega_z^2$ and the roots of the characteristic equation resulting from equating the determinant to zero are:

$$s = \pm j\omega_z \sqrt{(\sigma_x - 1)(\sigma_y - 1)}$$

The behavior of spacecraft 10 can be considered for three cases. When both $\sigma_x$ and $\sigma_y$ are greater than unity (first case), the roots are imaginary when no energy dissipation is present. Energy dissipation causes the roots to have a negative component and spacecraft 10 is dynamically stable. Fuel displacement introduced by a small dynamic unbalance, however, causes further unbalance and as the values of either $\sigma_x$ or $\sigma_y$ approach unity, the situation can become statically unstable.

When both $\sigma_x$ and $\sigma_y$ are less than unity (second case), the roots are also imaginary for the case of no energy dissipation. Energy dissipation causes the roots to have a positive component, however, and spacecraft 10 is unstable unless stabilized by other means. When $\sigma_x$ is greater than unity and $\sigma_y$ is less than unity (third case), or vice versa, one root is negative and the other positive. The wobble diverges rapidly unless some means is used to stabilize it.

Now consider the behavior of the system when the thruster feedback provided by control system 40 is used to stabilize spacecraft 10. The roots of the characteristic equation for the first two cases are:

$$s = -K \pm j\omega_z \sqrt{(\sigma_x - 1)(\sigma_y - 1)}$$

The feedback constant K causes the roots to have a negative component K, which can be as large as needed to overcome the instabilities associated with those cases. For the third case, the stability criterion (no roots with positive components) is:

$$K^2 > (\sigma_x - 1)(\sigma_y - 1)\omega_z^2$$

which is easily met.

Thus, control system 40 can be used to stabilize spacecraft 10 for all ratios of moments of inertia.

While the above description constitutes the preferred embodiments of the present invention, it will be appreciated that the invention is susceptible to modification, variation and change without departing from the proper scope and fair meaning of the accompanying claims.

What is claimed is:

1. A stabilization system, for a spinning spacecraft, for providing rotational stability about an axis of rotation, comprising:

measuring means for detecting angular rates of motion along first and second orthogonal axes mutually perpendicular to said axis of rotation and for providing error signals proportional to said angular rates;

a first pair of control thrusters for providing positive and negative moments about said first axis;

a second pair of control thrusters for providing positive and negative moments about said second axis;

control means for firing one of said first pair of control thrusters in response to said error signals about said first axis and for firing one of said second pair of control thrusters in response to said error signals about said second axis, whereby said spacecraft is maintained in stability; and, wherein said spacecraft has a main thruster for orbit transfer and each of said control thrusters produce thrust acting in the direction of thrust of said main thruster.

2. A stabilization system, for a spinning spacecraft, for providing rotational stability about an axis of rotation, comprising:

measuring means including a pair of rate gyros for measuring transverse angular rates of said spacecraft along first and second orthogonal axes mutually perpendicular to said axis of rotation, and for generating error signals proportional to said measured angular rates;

a first pair of control thrusters for providing positive and negative moments about said first axis;

a second pair of control thrusters for providing positive and negative moments about said second axis; and, control means including duty cycle modulators for providing pulse width modulated control signals for firing one of said first pair of control thrusters in response to said error signals about said first axis and for providing pulse width modulated control signals for firing one of said second pair of control thrusters in response to said error signals about said second axis, whereby said spacecraft is maintained in stability.

3. A stabilization system, for a spinning spacecraft, for providing rotation stability about an axis of rotation, comprising:

measuring means for detecting angular rates of motion along first and second orthogonal axes mutually perpendicular to said axis of rotation, and for generating positive and negative error signals proportional to said detected angular rates along each of said first and second orthogonal axes;

a first pair of control thrusters for providing positive and negative moments about said first axis;

a second pair of control thrusters for providing positive and negative moments about said second axis;

control means including a first pair of duty cycle modulators responsive to said negative error signals for generating modulated control signals for firing said control thrusters for providing negative moments about said first and second axes, respectively, and a second pair of duty cycle modulators responsive to said positive error signals for generating modulated control signals for thrusters for providing positive moments about said first and second axes, respectively, whereby said spacecraft is maintained in stability.

4. The system as set forth in claim 3, wherein said positive and negative error signals have a nominal frequency, and said spacecraft has a nominal spin frequency, and wherein further, said nominal frequency of said positive and negative error signals is several times greater than said nominal spin frequency of said spacecraft.

5. The system as set forth in claim 3, wherein each of said duty cycle modulators provides a duty cycle modulation period $T_1$, and said spacecraft has a spin period $T_2$, said control thrusters having a duty cycle equal to the width t of said modulated control signal respectively applied thereto divided by $T_1$, and wherein further, $T_1$ is substantially less than $T_2$.

* * * * *